United States Patent [19]

Takatsu et al.

[11] Patent Number: 6,064,774
[45] Date of Patent: May 16, 2000

[54] IMAGE PROCESSING METHOD AND SYSTEM AND COMPUTER PROGRAM PRODUCT THEREFOR

[75] Inventors: Kazunori Takatsu; Takashi Saitoh, both of Yokohama, Japan

[73] Assignee: Ricoh Company, Ltd., Tokyo, Japan

[21] Appl. No.: 09/009,772

[22] Filed: Jan. 20, 1998

Related U.S. Application Data

[62] Division of application No. 08/539,334, Oct. 4, 1995, abandoned.

[30] Foreign Application Priority Data

Oct. 12, 1994 [JP] Japan .................................. 6-245869

[51] Int. Cl.[7] ...................................................... G06K 9/36
[52] U.S. Cl. ........................ 382/245; 382/246; 358/261.1; 358/261.3
[58] Field of Search ............................... 358/261.1–261.3, 358/427, 426; 382/245, 246, 232, 233, 243, 180; G06K 8/36

[56] References Cited

U.S. PATENT DOCUMENTS

| | | | |
|---|---|---|---|
| 4,718,090 | 1/1988 | Cooper, Jr. ............................. | 382/204 |
| 4,792,981 | 12/1988 | Cahill, III et al. ..................... | 382/235 |
| 5,056,104 | 10/1991 | Aono et al. ............................ | 358/429 |
| 5,177,622 | 1/1993 | Yoshida et al. ....................... | 380/429 |
| 5,199,083 | 3/1993 | Takeda .................................. | 382/180 |
| 5,303,313 | 4/1994 | Mark et al. ............................ | 382/235 |

FOREIGN PATENT DOCUMENTS 4-85685  3/1992  Japan .

OTHER PUBLICATIONS

Image Component Labeling From MR Codes, Electronic Information Communication Society Paper, D–II, vol. J767–D–II, No. 11, pp. 2341–2348, Nov. 1993.
Base and Application of Facsimile (Japanese Book), Appendix, CCITT Facsimile Recommendation, pp. 383–396.
CCITT, Fascicle VII.3—Recommendation T.4, pp. 23–35 and 39–43, and Recommendation T.6, pp. 48–57.

*Primary Examiner*—Cheeukfan Lee
*Attorney, Agent, or Firm*—Oblon, Spivak, McClelland, Maier & Neustadt, P.C.

[57] ABSTRACT

Given run length codes are decoded and continuity between a run currently being processed and a previously processed run is determined. Then, the same label as that of said previously processed run is designated to a said run currently being processed if it is determined that they are continuous with one another. A link is formed between a plurality of previously processed runs if it is determined that said run currently being processed is continuous with each of the plurality of previously processed runs, thus labels of the plurality of previously processed runs being integrated together. If MR or MMR codes are used, the run length codes include information concerning relationship between color-changing pixels situated on an immediately preceding decoded scan line and color-changing pixels situated on a scan line currently being decoded which is located immediately below the immediately preceding decoded scan line. By appropriately using this information concerning the relationship of the color-changing pixels between adjacent two scan lines, continuity of black-pixel runs present on the scan line currently being decoded with black-pixel runs present on the immediately preceding decoded scan line is determined.

6 Claims, 10 Drawing Sheets

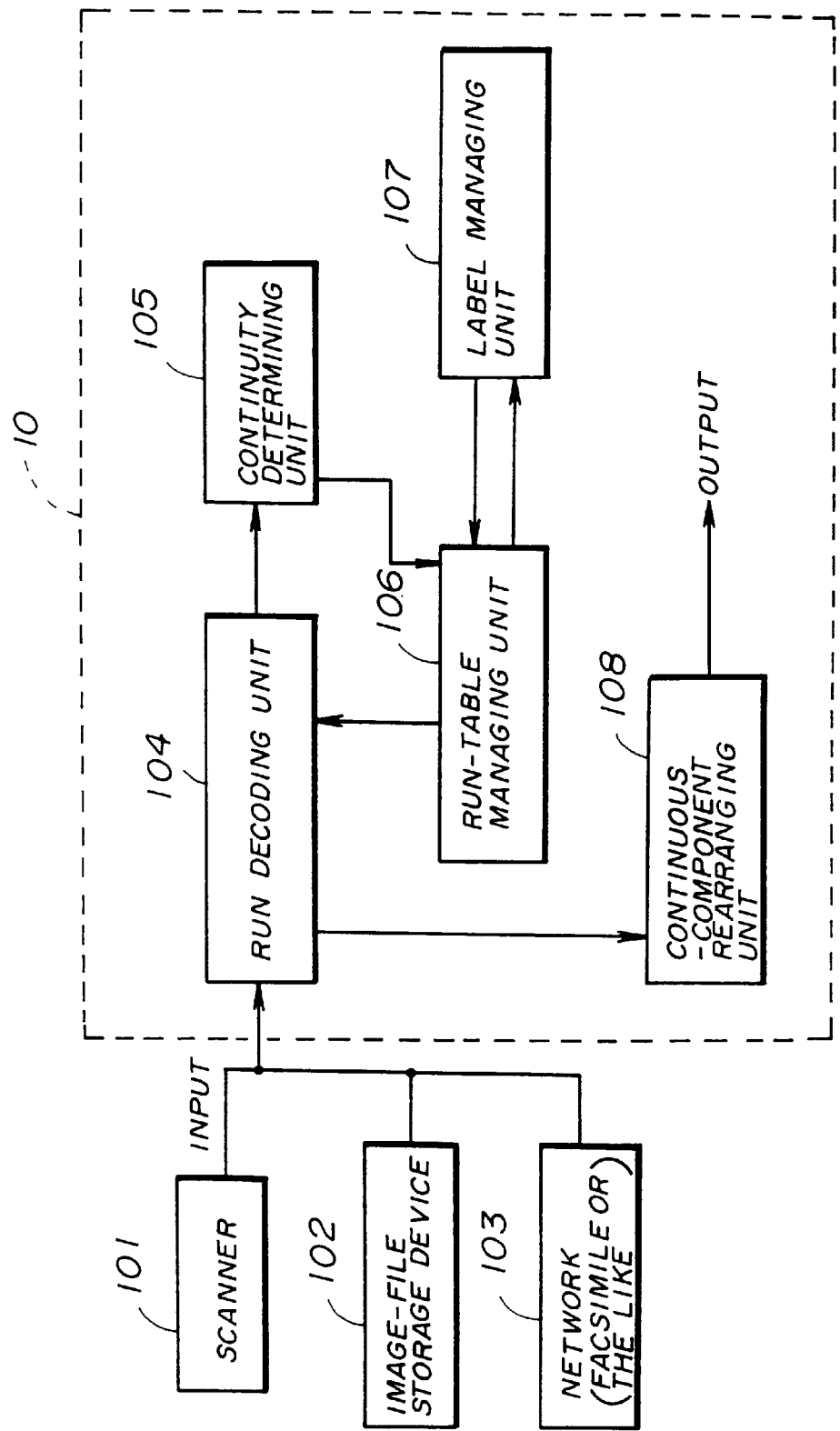

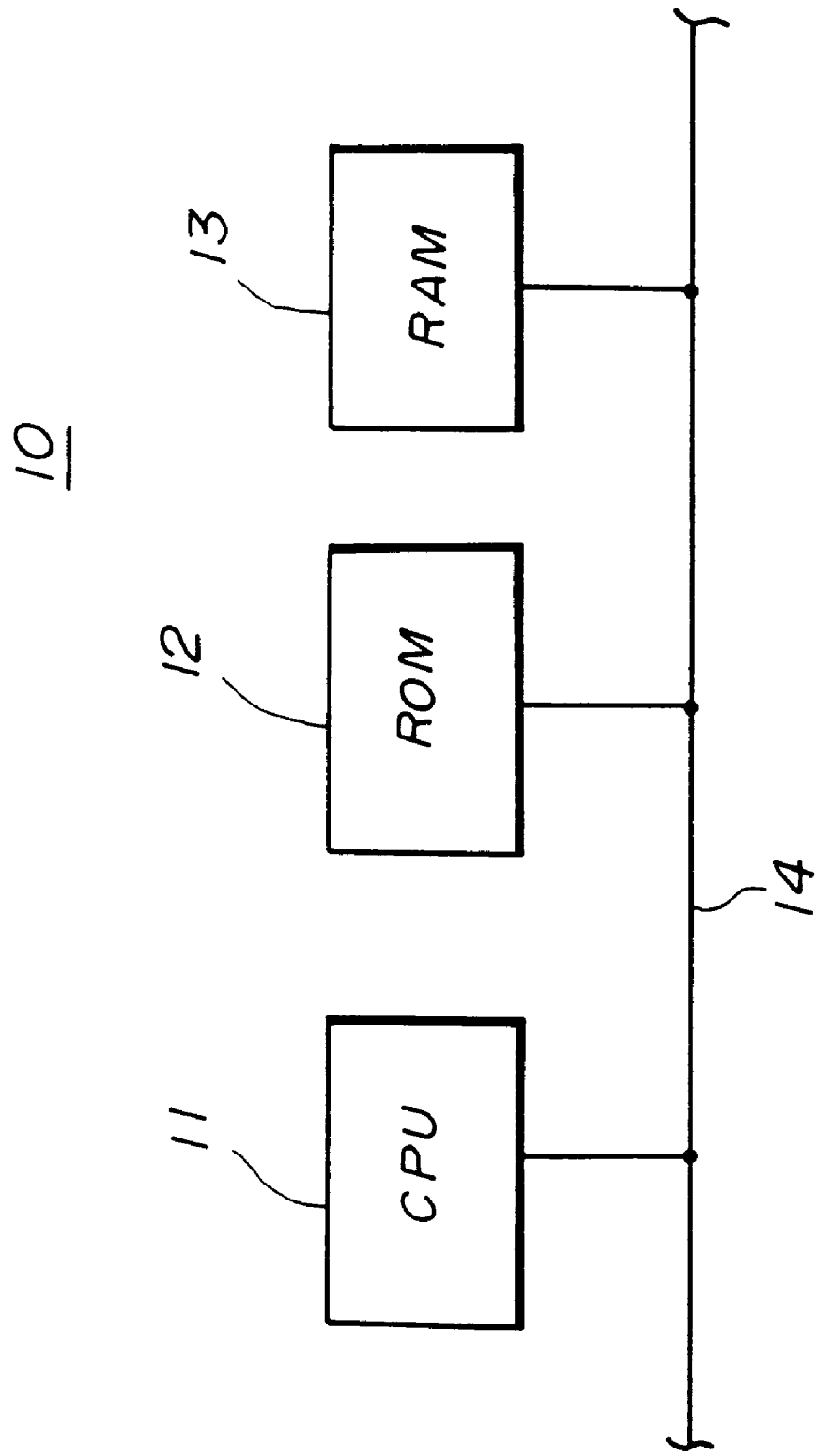

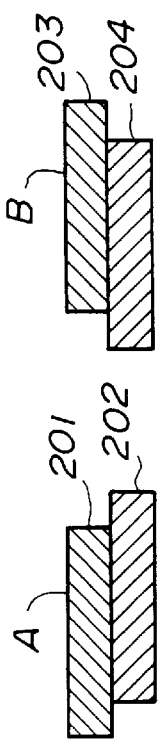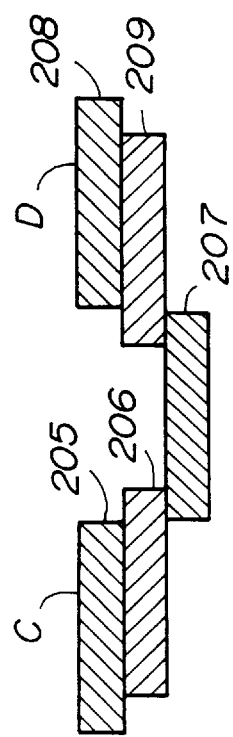

IMAGE PROCESSING METHOD AND SYSTEM AND COMPUTER PROGRAM PRODUCT THEREFOR

This application is a Division of application Ser. No. 08/539,334, filed on Oct. 4, 1995, abandoned.

BACKGROUND OF THE INVENTION

1. Field of the Invention

The present invention relates to an image processing method and system, and, in particular, to an image processing method and system directly extracting continuous components (patterns) from given image data which is in a data form encoded using, particularly, the well-known MH (Modified Huffman) encoding method, MMR (Modified Modified READ (Relative Element Address Designate)) encoding method, or MR (Modified READ) encoding method, each of which is normally used in facsimile transmission.

2. Description of the Related Art

A technique for extracting, at high speed, continuous components (patterns) from given image data is necessary for an image compression method in which patterns are extracted from given image data and are then represented by appropriate templates, and is also necessary for character recognition. In particular, when O.A. (Office Automation) machines are linked via a network and facsimile machines are used as means for transmitting and receiving data via the network, a technique for processing, at high speed, information received through a facsimile machine is important.

However, in the related art, it is necessary that given image data encoded into run length codes, which codes are used in facsimile transmission, is returned to a bit-map form. Then, the given image data in the bit-map form is used for extracting patterns therefrom. If such a method is used, it is difficult to reduce a time required for processing the given image data.

In order to reduce the above-mentioned processing time, a method was proposed in which two-scan-line scanning is performed. Further, similar to the two-scan-line scanning, a method of performing a labeling operation directly on run length codes was proposed. Further, using the fact that MR codes (or MMR codes) have therein information concerning the continuous components of a given image, a method of performing the labeling operation directly on the MR codes so as to extract the continuous components was proposed. (See *Image Component Labeling* from MR Codes, Electronic Information Communication Society Paper, D-II, Vol.J76-D-II, No.11, pp.2341–2348, November, 1993; and Japanese Laid-Open Patent Application No.4-85685.)

In the method disclosed in the above-mentioned paper or laid-open patent application, when the labeling operation is performed on given image data encoded into the MR codes, it is necessary to determine which one from among three encoding modes was used in obtaining the given image data as a result of encoding according to the MR encoding method. In addition to this, it is also necessary to determine a color of a first pixel in a relevant run (a series of pixels having the same color), a state of a color of a pixel in a reference line (scan line) at the same position as that of the above-mentioned pixel, a color of a pixel in the reference line at the same position as that of a first pixel of a run continuous with the relevant run, and a color of the preceding pixel. Thus, a relevant process is complex. Further, in the technique disclosed in the Japanese laid-open patent application, when labels are linked to one another, each set of labels to be linked is stored, and then, new labels are designated to the stored sets. Thus, a relevant process requires considerable time.

SUMMARY OF THE INVENTION

An object of the present invention is to provide an image processing method in which a process of extracting the continuous components is simplified, and also, by linking labels to one another, it is possible to reduce a time required for redesignating labels to the continuous components.

According to the present invention, given run length codes representing an image are decoded and using thus-decoded information, continuity between a run currently being processed and a previously processed run is determined. Then, the same label as that of said previously processed run is designated to said run currently being processed run if it is determined that they are continuous with one another. A link is formed between a plurality of previously processed runs if it is determined that said run currently being processed run is continuous with each of said plurality of previously processed runs, thus labels of said plurality of previously processed runs being integrated together. If the given run length codes are MR or MMR codes, the run length codes include information concerning relationship between color-changing pixels situated on an immediately preceding decoded scan line and color-changing pixels situated on a scan line currently being decoded which is located immediately below the immediately preceding decoded scan line. By appropriately using this information concerning the relationship of the color-changing pixels between adjacent two scan lines, continuity of black-pixel runs present on the scan line currently being decoded with black-pixel runs present on the immediately preceding decoded scan line is determined.

When image patterns (continuous components) are extracted from a given image, and stored as corresponding templates, wherein a common template are designated for similar patterns so as to reduce image information and thus compress the image information, or when the OCR (Optical Character Recognition or Optical Character Reading) function is added to a facsimile machine, it is convenient to use the run length codes such as the MH code, MR codes, and MMR codes which are normally used in facsimile transmission. In such a case, it is necessary to form a character from the run length codes. In such a case, in comparison to a method in the related art in which given image information is developed from MMR codes thereof into a bit-map format thereof, it is advantageous, in a data processing rate and a scale of a system for performing the data processing, to directly form a character from the MH code, MR codes or MMR codes according to the present invention described above.

In fact, according to the present invention, characteristics of MH, MR and MMR codes are effectively used and thus continuity between runs are easily determined directly from the codes without developing them into a bit-map format. Thus, many runes are appropriately integrated into sets of continuous runs, each set of continuous runs including runs which continues to one another. As a result, characters can be easily formed from the sets of continuous runs, and thus OCR operation or the like can be performed in high speed from the run length codes.

Other objects and further features of the present invention will become more apparent from the following detailed description when read in conjunction with the accompanying drawings.

BRIEF DESCRIPTION OF THE DRAWINGS

FIGS. 1A and 1B show block diagrams of an image processing system in an embodiment according to the present invention;

FIGS. 2A, 2B, 2C and 2D illustrate an operation of integrating labels of runs in the system shown in FIGS. 1A and 1B;

DESCRIPTION OF PREFERRED EMBODIMENTS

Figure 3:
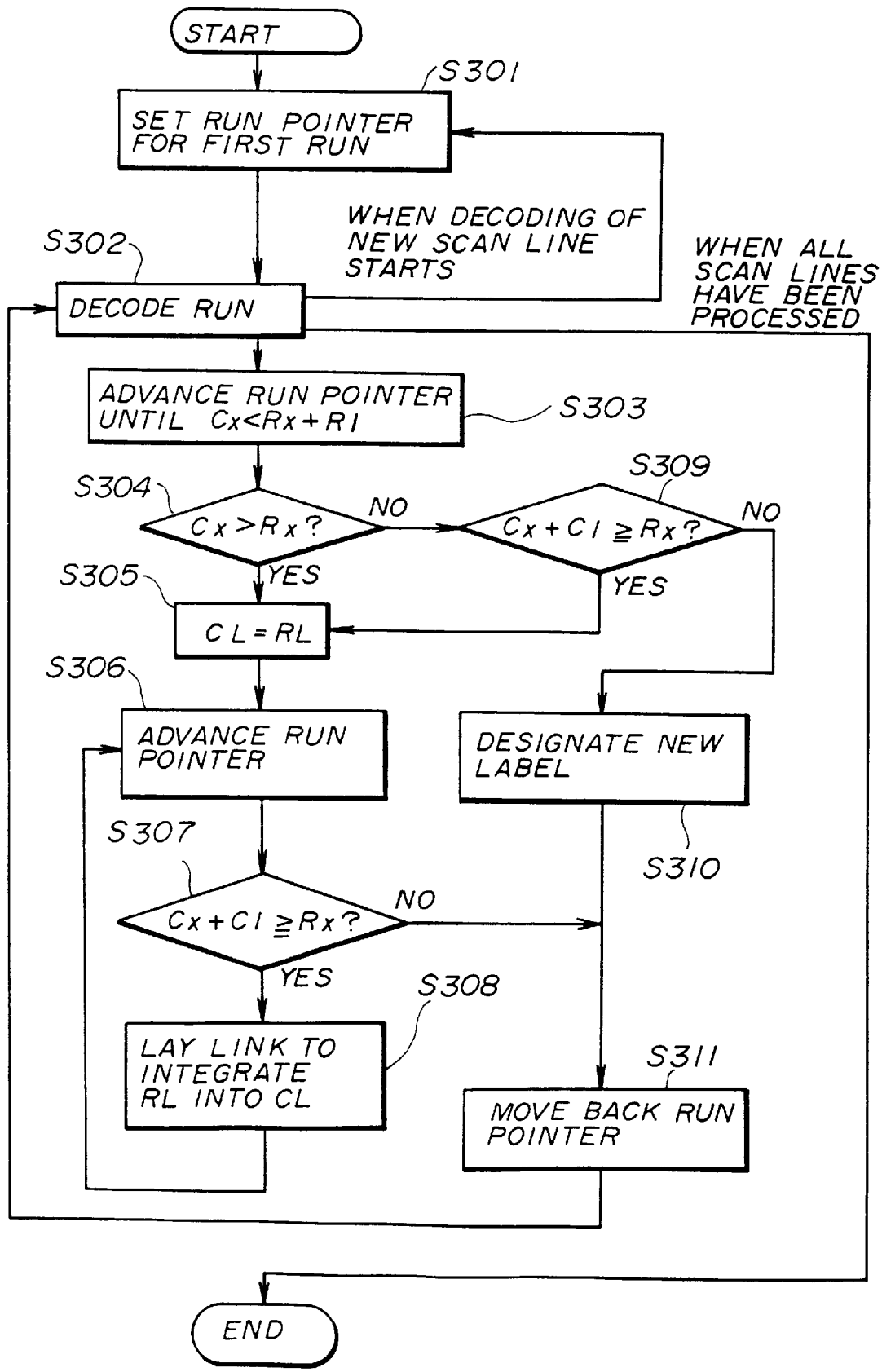
FIG. 3 shows an operation flowchart of a labeling operation performed on run length codes in MH codes in the system shown in FIGS. 1A and 1B.

With reference to FIG. 1A, an arrangement of an image processing system in an embodiment of the present invention will now be described. Run-length codes are input through an image scanner 101, from an image-file storage device 102 such as a disk drive device, or via a communication network 103 using a facsimile machine. The run length codes are encoded given image data and are the above-mentioned MH codes, MR codes or MMR codes representing an arrangement of white and black pixels which constitute a given image. The term 'run' means a series of pixels along a main-scan direction having the same color, white or black, and the term 'run length' means a length of the run.

The thus-input run length codes are decoded through a run decoding unit 104 so that information indicating an arrangement of runs is obtained if the run length codes are the MH codes. If the run length codes are either the MR codes or MMR codes, information indicating a difference in run arrangements between a scan line currently being decoded and a previously decoded reference scan line of the given image is obtained. By using such information, a continuity determining unit 105 determines whether a run present on a scan line currently being decoded is continuous with a run present on an immediately preceding decoded scan line.

A run-table managing unit 106 manages a run table and stores therein runs extracted from the information obtained through the run decoding unit 104. The run-table managing unit 106 designates a label to a relevant run which is determined by the continuity determining unit 105 as being continuous with a run present on the immediately preceding decoded scan line, the label to be designated being the same as that of the run on the immediately preceding decoded scan line. If the relevant run has no run present on the immediately preceding decoded scan line continuous therewith, a new label is generated for the relevant run and stored in a label table through a label managing unit 107.

If the relevant run has a plurality of runs on the immediately preceding decoded scan line continuous therewith, after designating the same label as that of the first one of these plurality of runs to the relevant run, the label managing unit 107 links these plurality of runs together for integrating labels of the plurality of runs and the relevant run into a common label. Information concerning the linkage is stored in the label table.

A continuous-component rearranging unit 108 uses the information concerning the linkage stored in the label table and appropriately redesignates labels to the runs stored in the run table. Thus, a common label is designated to a plurality of runs which are continuous with one another. Such a plurality of runs are the above-mentioned continuous components.

With reference to FIG. 1B, a device arrangement of a data processing portion 10 will now be described. The data processing portion 10, as shown in FIG. 1A, includes the run decoding unit 104, continuity determining unit 105, run-table managing unit 106, label managing unit 107 and continuous-component rearranging unit 108.

The data processing unit 10 includes a CPU 11, a ROM 12, a RAM 13 and a data bus 14 connecting the CPU 11, ROM 12 and RAM 13 together. The CPU performs the above-described functions of the units 104 to 108 according to a software program stored in the ROM 12. The software program may be produced using a well-known software programing technique. The CPU reads the software program stored in the ROM 12 and then performs the functions of the present invention according instructions of the software program. A storage medium for storing the instructions is not limited to the ROM 12, and, for example, one of magnetic, optical, magneto-optical disks is also used for the same purpose. In such a case, a disk drive device suitable for driving the disk is provided and thus the instructions stored therein can be read by the CPU which then performs the functions according to the instructions.

The RAM 13 is used for storing the run table and label table, and also used for temporarily storing data generated during data processing performed by the CPU 11 if necessary.

An operation of extracting continuous components from given image data performed by the data processing portion 10 in a case where the run length codes are the MH codes will now be described with reference to FIGS. 2A, 2B, 2C and 2D.

First, the run length codes of a given image are decoded as mentioned above according to the MH decoding method reverse to the MH encoding method. Assuming that the given image has runs 201, 202, 203 and 204 shown in FIG. 2A, the run 202 on a lower scan line is continuous with the run 201 on an immediately preceding upper scan line. Similarly, the run 204 on the lower scan line is continuous with the run 203 on the immediately preceding upper scan line. In this case, a label 'A' is designated to the run 201 extracted from the decoded upper scan line. Similarly, a label 'B' is designated to the run 203 extracted from the decoded upper scan line. The thus-designated labels are stored in the above-mentioned label table 211 shown in FIG. 2D.

As described above, the run-table managing unit 106 designates a label to a run which is determined by the continuity determining unit 105 as being continuous with a run present on the immediately preceding decoded scan line, the label to be designated being the same as that of the run on the immediately preceding decoded scan line. In the above-assumed case, when the subsequent lower scan line is decoded, the run 202 is extracted. Then, it is determined that the run 202 is continuous with the run 201 present on the immediately preceding decoded scan line. As a result, the label 'A' of the run 201 is also designated to the run 202. Similarly, when the lower scan line is decoded, the run 204 is extracted. Then, it is determined that the run 204 is continuous with the run 203 present on the immediately preceding decoded scan line. As a result, the label 'B' of the run 203 is also designated to the run 204.

The above-mentioned run table 210 shown in FIG. 2C is used for storing starting-point coordinate values (x, y), the run length and the thus-designated label for each of the thus-extracted runs 201, 202, 203, and 204. This storage is performed such that data for a relevant run is stored in a row of the run table 210, which row is supplied for the relevant run which is currently pointed to by a run pointer. Each row of the run table 210 is supplied for a respective one of the runs extracted from the given image data.

Further, assuming that the given image has runs 205, 206, 207, 208, and 209 shown in FIG. 2B, the run 206 on a lower scan line is continuous with the run 205 on an immediately preceding upper scan line. Similarly, the run 209 on the lower scan line is continuous with the run 208 on the immediately preceding upper scan line. Further, the run 207 on a further lower scan line is continuous with both the runs 206 and 209 as shown in FIG. 2B. In this case, a label 'C' is designated to the run 205 extracted from the decoded upper scan line. Similarly, a label 'D' is designated to the run 208 extracted from the decoded upper scan line. The thus-designated labels are stored in the label table 211.

Further, when the subsequent lower scan line is decoded, the run 206 is extracted. Then, it is determined that the run 206 is continuous with the run 205 present on the immediately preceding decoded scan line. As a result, the label 'C' of the run 205 is also designated to the run 206. Similarly, when the lower scan line is decoded, the run 209 is extracted. Then, it is determined that the run 209 is continuous with the run 208 present on the immediately preceding decoded scan line. As a result, the label 'D' of the run 208 is also designated to the run 209.

As described above, if the relevant run has a plurality of runs on the immediately preceding decoded scan line continuous therewith, after designating the same label as that of the first one of these plurality of runs to the relevant run, the label managing unit 107 links these plurality of runs together for integrating labels of the plurality of runs and the relevant run into a common label. Information concerning the linkage is stored in the label table.

In the above-assumed case, the run table 210 shown in FIG. 2C is used for storing starting-point coordinate values (x, y), the run length and the thus-designated label for each of the thus-extracted runs 205, 206, 208 and 209. This storage is performed such that data for a relevant run is stored in a row of the run table 210, which row is supplied for the relevant run pointed to by the run pointer. Thus, when the run 207 is extracted, because the run 207 is continuous with the run 206 on the immediately preceding decoded scan line, the label 'C' of the run 206 is also designated to the run 207. Then, it is determined that the run 207 is also continuous with the run 209 on the immediately preceding decoded scan line. As a result, in the label table 211, a link is generated for linking the labels 'C' and 'D' together as shown in FIG. 2D.

As mentioned above, if a currently extracted run has no run present on an immediately preceding decoded scan line continuous therewith, a new label is generated for the relevant run and stored in a relevant row of the label table 211 through the label managing unit 107.

With reference to FIG. 3, an operation flow of the labeling operation performed on the run information obtained from the MH codes will now be described.

The run table managing unit 106 sets the run pointer to point to the first run present on an immediately preceding decoded scan line in a step S301 (the term 'step' being omitted, hereinafter). In S302, the run decoding unit 104 decodes the given run length MH codes for a next relevant run extracted from a scan line currently being decoded. In this case, an 'x' coordinate value of the first pixel of the relevant run is referred to as Cx, the run length thereof is referred to as Cl and a label designated thereto is referred to as CL. Further, similarly, an 'x' coordinate value of the first pixel of a run, to which the run pointer currently points, on the immediately preceding decoded scan line is referred to as Rx, the run length thereof is referred to as Rl and a label designated thereto is referred to as RL.

The run-table managing unit 106 repeatedly advances the run pointer to immediately subsequent runes on the immediately preceding decoded scan line until Cx<Rx+Rl in S303. Then, the continuity determining unit 105 determines whether or not Cx>Rx in S304. If it is determined that Cx>Rx, it is determined that the relevant run is continuous with the run currently pointed to by the run pointer. Accordingly, the run-table managing unit 106 determines that CL=RL in S305. Then, the run pointer is advanced to an immediately subsequent run on the immediately preceding decoded scan line in S306. The continuity determining unit 105 determines whether or not Cx+Cl≧Rx in S307. If it is determined that Cx+Cl≧Rx, it is determined that the relevant run is also continuous with the run currently pointed to by the run pointer. Accordingly, the label managing unit 107 generates a link in the label table so as to integrate RL into CL in S308.

If it is determined in S304 that Cx≦Rx, it is determined that the relevant run is not continuous with the run currently pointed to by the run pointer unless Cx+Cl≧Rx. If it is determined in S309 that Cx+Cl≧Rx, the run-table managing unit 106 determines that CL=RL. If not, that is, if it is determined that Cx+Cl<Rx, it is determined that the relevant run is not continuous with the run currently led to by the run pointer. Accordingly, the label managing unit 107 designates a new label to the relevant run in S310. Then, in S311, for labeling a subsequent relevant run on the scan line currently being decoded, the run pointer is moved back to point to the immediately preceding run on the above-mentioned immediately preceding decoded scan line. Then, the operation returns to S302.

If it is determined in S307 that Cx+Cl<Rx, it is determined that the relevant run is not continuous with the run currently pointed to by the run pointer. Then, for labeling a relevant run subsequent to the currently labeled relevant run, the run pointer is moved back to point to the immediately preceding run on the above-mentioned immediately preceding decoded scan line in S311.

By repeating such an operation according to the flowchart shown in FIG. 3, appropriate labeling of each run is performed.

By thus designating a common label to the continuous components or continuous runs extracted from given image data encoded into the run length codes such as the MH codes, relevant information regarding the given image data can be directly obtained as a result of appropriately integrating the continuous runs, without developing the given image data into the bit-map form so as to obtain run information therefrom.

A labeling operation performed on the MMR run length codes in the system in the embodiment of the present invention described with reference to FIGS. 1A and 2B will be described. This labeling operation may also be used on the MR run length codes because the MR and MMR encoding methods include a common encoding algorithm. With regard to the MR and MMR encoding methods, see CCITT, Fascicle VII.3—Recommendation T.4, pages 23–43, and Recommendation T.6, pages 48–57; and *Base and Application of Facsimile* (Japanese book), Appendix, 'CCITT Facsimile Recommendation', pages 383–396.

Figure 4:
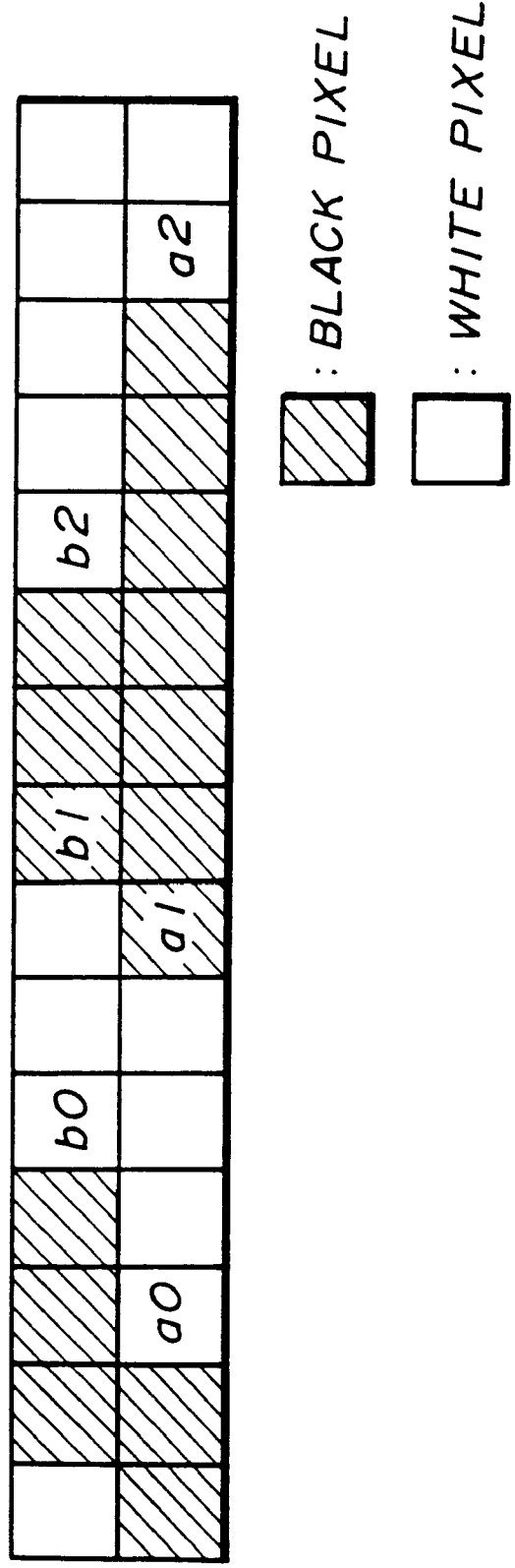
FIG. 4 illustrates definition of terms relating to the MMR encoding.

Prior to describing of the labeling operation, terms used in the description will be defined. FIG. 4 shows two scan lines including an upper reference scan line (an immediately preceding decoded scan line) and a lower scan line which is currently being decoded. With reference to FIG. 4, a first pixel of a current decoded run on the lower scan line is referred to 'a0'. A pixel which is present to the right of 'a0' having a first changed color is referred to as 'a1'. A pixel which is present to the right of 'a1' having a first changed color is referred to as 'a2'.

On the upper reference scan line, a first pixel in a run immediately to the right of 'a0' having a different color from the color of 'a0' is referred to as 'b1'. A first pixel of a run immediately to the left of 'b1' is referred to as 'b0'. A pixel which is present to the right of 'b1' having a first changed color is referred to as 'b2'.

According to the MMR encoding method, encoding is performed in one of three modes: a pass mode, a vertical mode and a horizontal mode.

When b2 is present to the left of a1, the pass mode is selected. In this case, the fact that the encoding mode used is the pass mode is encoded.

When a distance between a1 and b1 is equal to or less than three pixels, the vertical mode is selected. In this case, the distance between a1 and b1 is encoded.

In a state other than one of the above-mentioned two kinds of states, the horizontal mode is selected. In this case, a distance between a0 and a1 and a distance between a1 and a2 are encoded.

In the case where the given run length codes are the MMR codes, the continuous components of the given image can be extracted from the run length codes through a process which will now be described with reference to FIGS. 5A, 5B, 5C, 5D, 5E, 5F, 6A, 6B, 6C, 6D and 6E.

1. (A) A case will now be considered in which it is determined through the MMR decoding that a0 is a white pixel and also an encoding mode which was used for encoding this portion of the lower scan line is the pass mode (only a position of a0 is previously known).

Normally, each scan line starts from the white-pixel run. Then, the white-pixel run and black-pixel run are alternately repeated. According, during the decoding, whether a run currently being decoded is the white or black-pixel run is previously determined. In fact, if a run has a same length, a code thereof is different between the white and black-pixel runs. If a scan line starts from the black-pixel run, the white-pixel run having a length '0' is imaginarily inserted at the beginning of the scan line.

The position of a0 is previously known as mentioned above. a0 is a first of a run currently being decoded, and thus the position of a0 is previously known. The position of a0 is updated each time a run is decoded as will be described.

Figure 5A:
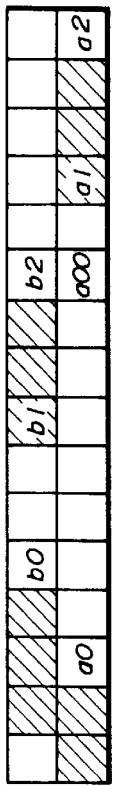
FIG. 5A illustrates a pixel arrangement for example for which a pass mode is used for the MMR encoding when a0 is a white pixel.

Because the used encoding mode is the pass mode, it is determined that b2 is located to the left of a1. Accordingly, as shown in FIG. 5A, it is determined that a run of the black pixels starting at a1 on the lower scan line is not continuous with a run of the black pixels ending at a pixel immediately to left of b2 on the upper reference scan line. As a result, nothing is performed.

(B) A case will now be considered in which it is determined through the MMR decoding that a0 is the white pixel and also the encoding mode which was used for encoding this portion of the lower scan line is the vertical mode (positions of a0 and a1 are known, and also a1≦b2, where a1≦b2 means that (x-coordinate value of a1)≦(x-coordinate value of b2), similar expressions being used, hereinafter).

In the vertical mode, a distance between a1 and b1 is encoded. A position of b1 is previously known because the b1 is present in the upper scan line and is previously decoded. Accordingly, the position of a1 is determined using the distance between the a1 and b1.

Figure 5B:
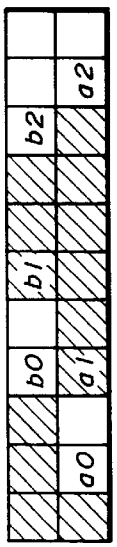
FIGS. 5B and 5C illustrate pixel arrangements for example for which a vertical mode is used for the MMR encoding when a0 is the white pixel.

In this case,

B-1) when b0≧a1, it is determined that a black-pixel run starting at a1 is continuous with a black-pixel run ending at a pixel immediately to the left of b0 as shown in FIG. 5B. Accordingly, the same label as that of the black-pixel run immediately to the left of b0 is designated to the black-pixel run starting at a1.

Figure 5C:
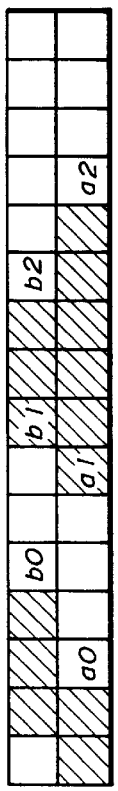

B-2) When b0<a1, as shown in FIG. 5C, the black-pixel run starting at a1 is not continuous with the black-pixel run ending at the pixel immediately to the left of b0. Accordingly, nothing is performed.

Figure 5D:
FIGS. 5D, 5E and 5F illustrate pixel arrangements for example for which a horizontal mode is used for the MMR encoding when a0 is the white pixel.

(C) A case will now be described in which it is determined through the MMR decoding that a0 is the white pixel and also the encoding mode which was used for encoding this portion of the lower scan line is the horizontal mode (a0, a1 and a2 are known, and also a1≦b2). In this case, C-1) when b0≧a1, as shown in FIG. 5D, it is determined that a black-pixel run starting at a1 is continuous with a black-pixel run ending at a pixel immediately to the left of b0. Accordingly, the same label as that of the black-pixel run ending at the pixel immediately to the left of b0 is also designated to the black-pixel run starting at a1. In a special case, not shown in FIG. 5D, where also a2≧b1, it is determined that the black-pixel run starting at a1 and ending at a pixel immediately to the left of a2 is also continuous with a black-pixel run starting at b1. Accordingly, a label of the black-pixel run starting at b1 is integrated into the label of the black-pixel run ending at the pixel immediately to the left of b0.

Figure 5E:
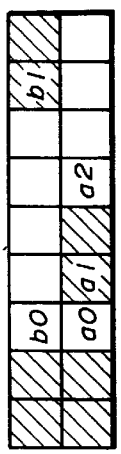

C-2) When b0<a1 and also a2<b1, as shown in FIG. 5E, it is determined that the black-pixel run starting at a1 is not continuous with the black-pixel run ending at the pixel immediately to the left of b0, and also the black-pixel run starting at a1 and ending at a pixel immediately to the left of a2 is not continuous with a black-pixel run starting at b1. Accordingly, because it is determined that the run starting at a1 and ending at the pixel immediately to the left of a2 is not continuous with any black-pixel run present on the upper reference scan line as shown in FIG. 5E, a new label is designated to this run on the lower scan line.

Figure 5F:
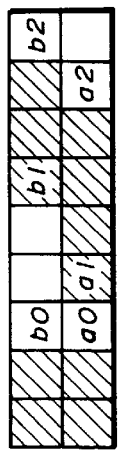

C-3) When b0<a1 and also a2≧b1, as shown in FIG. 5F, it is determined that a black-pixel run starting at a1 is not continuous with a black-pixel run ending at a pixel immediately to the left of b0, and also the same black-pixel run ending at a pixel immediately to the left of a2 is continuous with a black-pixel run starting at b1. Accordingly, the same label as that of the black-pixel run starting at b1 is designated to the black-pixel run starting at a1.

Figure 6A:
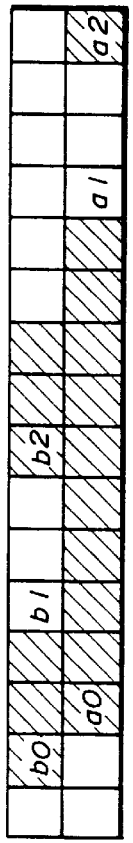
FIG. 6A illustrates a pixel arrangement for example for which the pass mode is used for the MMR encoding when a0 is a black pixel.

2. (A) A case will now be described in which it is determined through the MMR decoding that a0 is a black pixel and also the encoding mode which was used for encoding a relevant portion of the lower scan line is the pass mode (only a0 is known). In this case, b2<a1 because the used encoding mode is the pass mode, and thus a black-pixel run ending at a pixel immediately to the left of a1 is continuous with a black-pixel run starting at b2. Further, according to the term definition, b1>a0. Accordingly, the same black-pixel run starting at a0 and ending at the pixel immediately to the left of a1 is continuous with a black-pixel run ending at a pixel immediately to the left of b1. As a result, as shown in FIG. 6A, the black-pixel run starting at a0 and ending at the pixel immediately to the left of a1 is continuous with both the black-pixel run ending at the pixel immediately to the left of b1 and the black-pixel run starting at b2.

Accordingly, the same label as that of a black-pixel run starting at b0 is designated to a black-pixel run starting at a0. Further, a label of a black-pixel run starting at b2 is integrated into the label of the black-pixel run starting at b0.

Figure 6B:
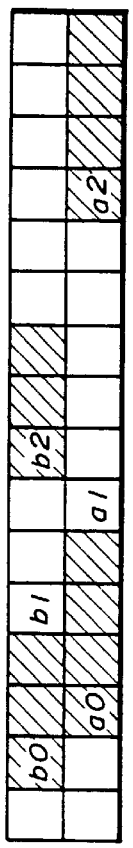
FIGS. 6B and 6C illustrate pixel arrangements for example for which the vertical mode is used for the MMR encoding when a0 is the black pixel.

(B) A case will now be considered in which it is determined through the MMR decoding that a0 is the black pixel and also the encoding mode which was used for encoding this portion of the lower scan line is the vertical mode (a0 and a1 are known, and also a1≦b2). In this case, B-1) when b0≦a1, as shown in FIG. 6B, it is determined that a black-pixel run ending at a pixel immediately to the left of a1 is continuous with a black-pixel run starting at b0, and thus the same label as that of the black-pixel run starting at b0 is also designated to the black-pixel run starting at a0, that is, the black-pixel run ending at the pixel immediately to the left of a1.

Figure 6C:
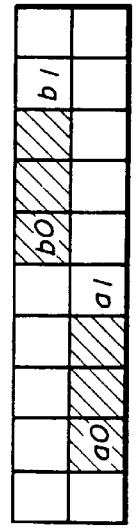

B-2) When b0>a1, as shown in FIG. 6C, because, according to the term definition, b1 is present to the right of a0, it is determined that a black-pixel run starting at a0 and ending at a pixel immediately to the left of a1 has no black-pixel runs continuous therewith. Accordingly, a new label is designated to the black-pixel run starting at a0 and ending at a pixel immediately to the left of a1.

Figure 6D:
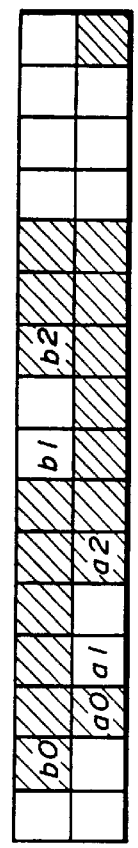
FIGS. 6D and 6E illustrate pixel arrangements for example for which the horizontal mode is used for the MMR encoding when a0 is the black pixel.

(C) A case will now be described in which it is determined through the MMR decoding that a0 is the white pixel and also the encoding mode which was used for encoding this portion of the lower scan line is the horizontal mode (a0, a1 and a2 are known, and also a1≦b2). In this case, C-1) when b0≦a1, as shown in FIG. 6D, because, according to the term definition, b1 is present to the right of a0, it is determined that a black-pixel run starting at a0 and ending at a pixel immediately to the left of a1 is continuous with a black-pixel run starting at b0 and ending at a pixel immediately to the left of b1. Accordingly, the same label as that of the black-pixel run starting at b0 is also designated to the black-pixel run starting at a0.

Figure 6E:
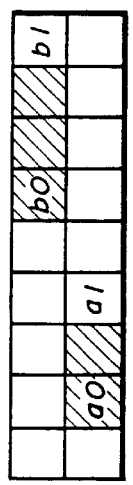

C-2) When b0>a1, as shown in FIG. 6E, because, according to the term definition, b1 is present to the right of a0, it is determined that a black-pixel run starting at a0 and ending at a pixel immediately to the left of a1 has no black-pixel runs continuous therewith. Accordingly, a new label is designated to the black-pixel run starting at a0 and ending at a pixel immediately to the left of a1.

As mentioned above, the MR and MMR encoding methods include the common encoding algorithm. In other words, an MR encoding operation is a combination of an MH encoding operation and an MMR encoding operation for each set of several scan lines. Accordingly, the above-described method may be also applied to an operation of appropriately extracting, by performing an appropriate labeling operation, continuous components of a given image from given MR run length codes. Using information of the thus-extracted continuous components of the given image, relevant characters can be formed, and the thus-obtained characters may be used for a character recognition operation and so forth.

Figure 7:
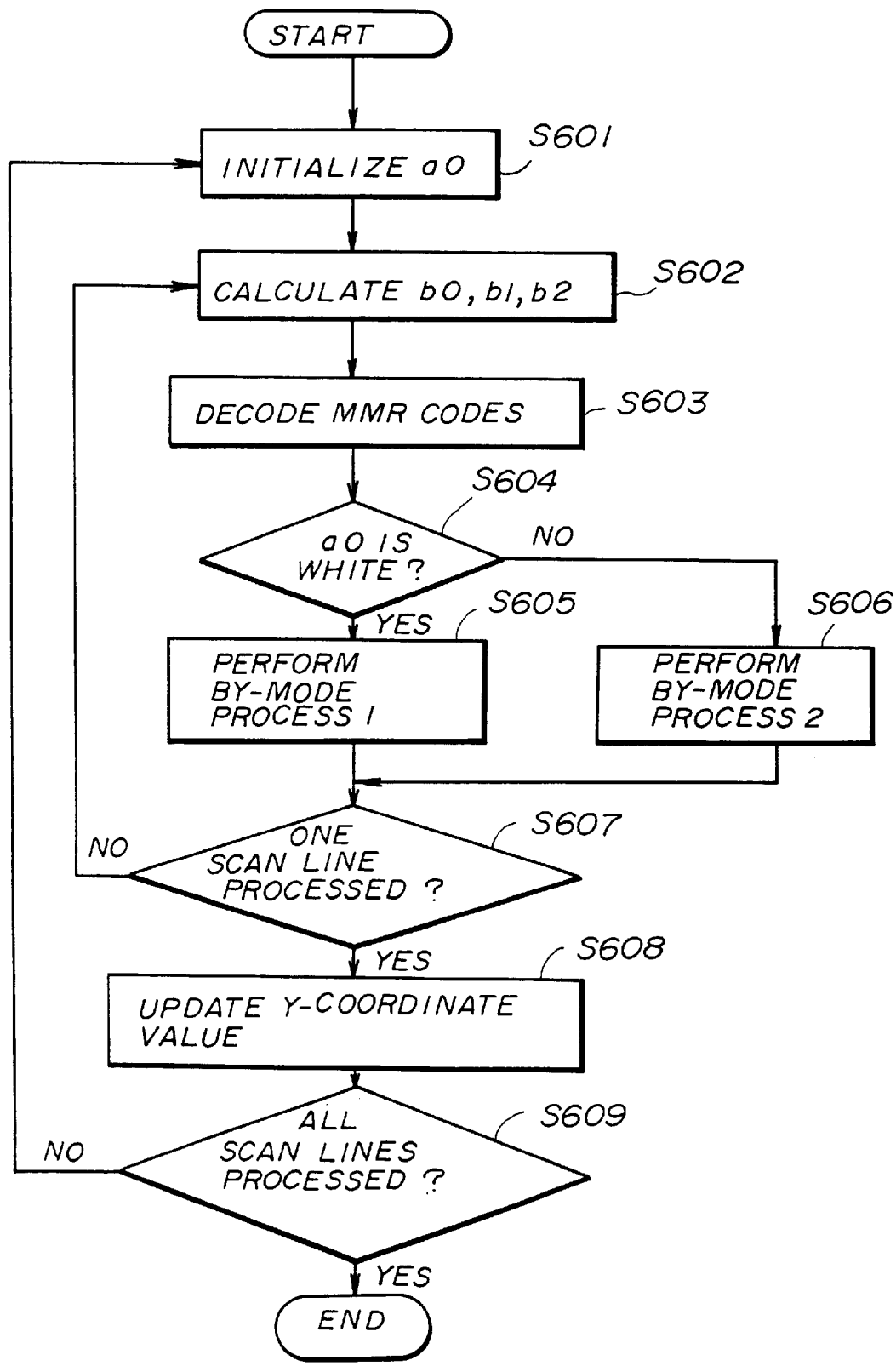
FIG. 7 shows an operation flowchart of the labeling operation performed on run length codes in MMR codes in the system shown in FIGS. 1A and 1B.

With reference to FIG. 7, an operation flow of the labeling operation performed on MMR run length codes will now be described. This operation is performed using the system described with reference to FIGS. 1A and 1B.

The run decoding unit 104 initializes a position of a0 in S601 and thus a0 is determined to be positioned at the white pixel or an imaginary white pixel at the beginning of a scan line currently being decoded. With respect to the thus-initialized position of a0, calculates positions of b0, b1 and b2 using decoded information concerning the immediately preceding decoded scan line, in S602. Then, after decoding the MMR codes in S603, the continuity determining unit 105, run-table managing unit 106 and label managing unit 107 performs, according to whether a0 is the white pixel or black pixel, an appropriate one of a by-mode process 1 in S605 and a by-mode process 2 in S606, which processes will be described later.

In each of the by-mode processes, a0 is updated. Each time after updating a0, a calculation of b0, b1 and b2 in S602 is performed. Such a cyclic operation is continued until the scan line currently being decoded has been processed. When the scan line currently being decoded has been processed, a y-coordinate value is updated in S608 and thus the scan line currently being decoded is updated. Then, it is determined whether or not all scan lines have been processed, in S609. If they have not been processed, an a0 initializing in S601 is again performed.

Figure 8:
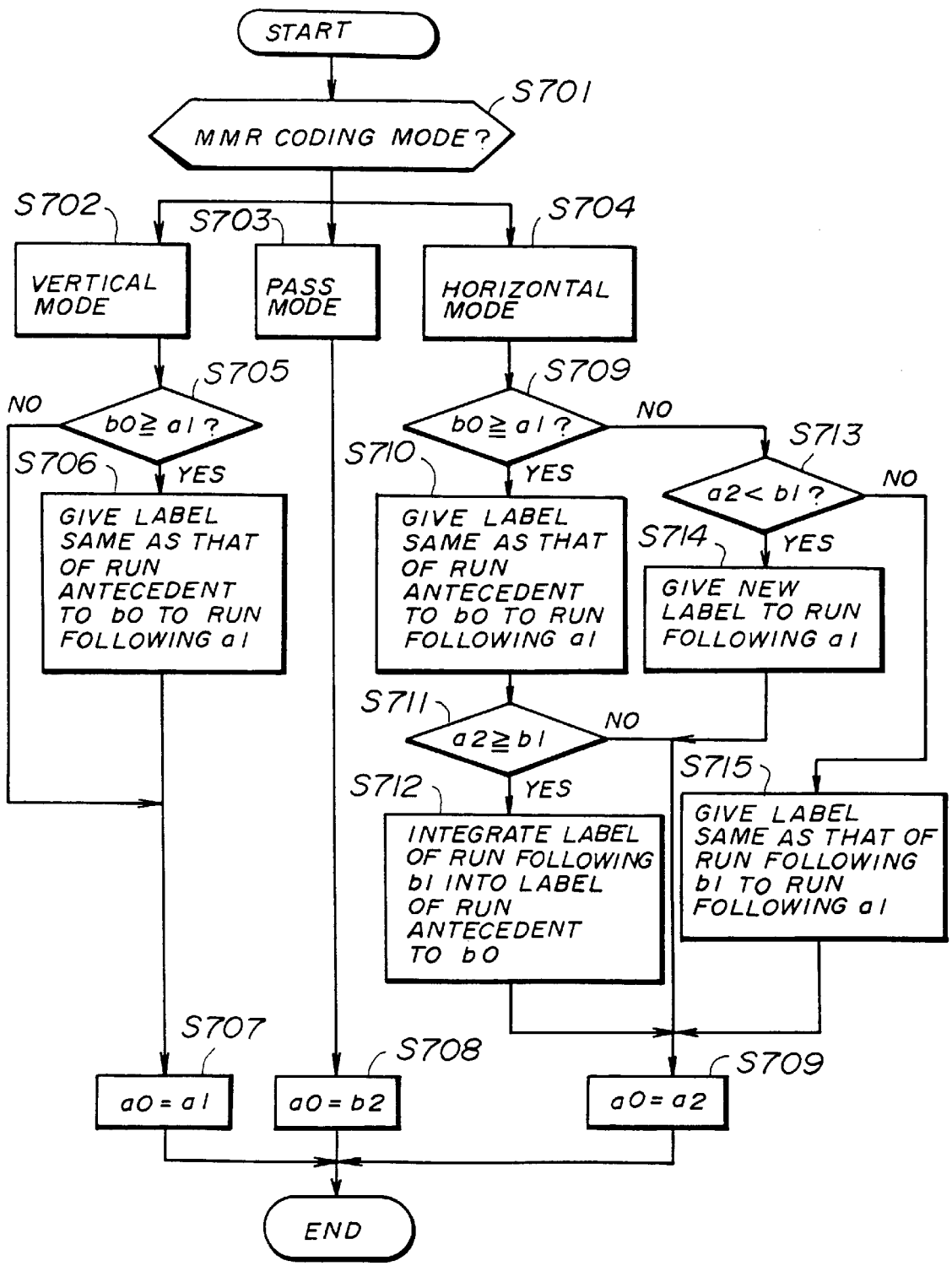
FIGS. 8 and 9 show operation flowcharts of by-mode processes 1 and 2 shown in FIG.7.

With reference to FIG. 8, an operation flow of the above-mentioned by-mode process 1 (for the case that a0 is the white pixel) will now be described. According to an encoding mode which was used for encoding a relevant portion of a scan lien currently being decoded, an appropriate one of S702 for the vertical mode, S703 for the pass mode and S704 for the horizontal mode is selected, in S701. When S703 for the pass mode is selected, nothing is performed and a0 is updated. Specifically, for a subsequent decoding operation, a00 (see FIG. 5A) is set as a new a0 below b2, in S708.

When S702 for the vertical mode is selected, if b0≧a1 in S705, it is determined that a run starting at a1 is continuous with a run ending at a pixel immediately to the left of b0 as shown in FIG. 5B. Accordingly, the same label as that of the run ending at the pixel immediately to the left of b0 is designated to the run starting at a1 in S706. Then, a0 is updated and thus a new a0 is positioned at a position of the current a1, in S707.

FIG. 5B illustrates an example of a pixel arrangement in which the run starting at a1 is continuous with the run starting at b1. However, at this time, a position of a2 is not known. Therefore, it cannot be determined positively that the run starting at a1 is continuous with the run starting at b1. In fact, if the run starting at a1 includes only one pixel, the run starting at a1 is not continuous with the run starting at b1. At the time the new a0 is positioned at the position of the current a1, the position of a2 can be determined. As a result, it can then be determined whether or not the run starting at a1 is continuous with the run starting at b1.

When S704 for the horizontal mode is selected, similarly, if b0≧a1 in S709, it is determined that a run starting at a1 continues to a run ending at a pixel immediately to the left of b0 as shown in FIG. 5D. Accordingly, the same label as that of the run ending at the pixel immediately to the left of b0 is designated to the run starting at a1 in S710. Then, if, in addition, a2≧b1, it is determined that the run starting at a1 is also continuous with a run starting at b1. Accordingly, a label of the run starting at b1 is integrated into the label of the run ending at the pixel immediately to the left of b0 in S712.

If it is determined that b0<a1 in S709, it is determined whether or not a2<b1 in S713. If it is determined that a2<b1, as shown in FIG. 5E, a new label is designated to the run starting at a1 in S714. If it is determined in S713 that a2≧b1, it is determined that the run starting at a1 is continuous with the run starting at b1, as shown in FIG. 5F. Accordingly, a label the same as that of the run starting at b1 is designated to the run starting at a1 in S715. After performing the labeling operation, a0 is updated and thus a new a0 is positioned at a position of the current a2 in S716.

Figure 9:
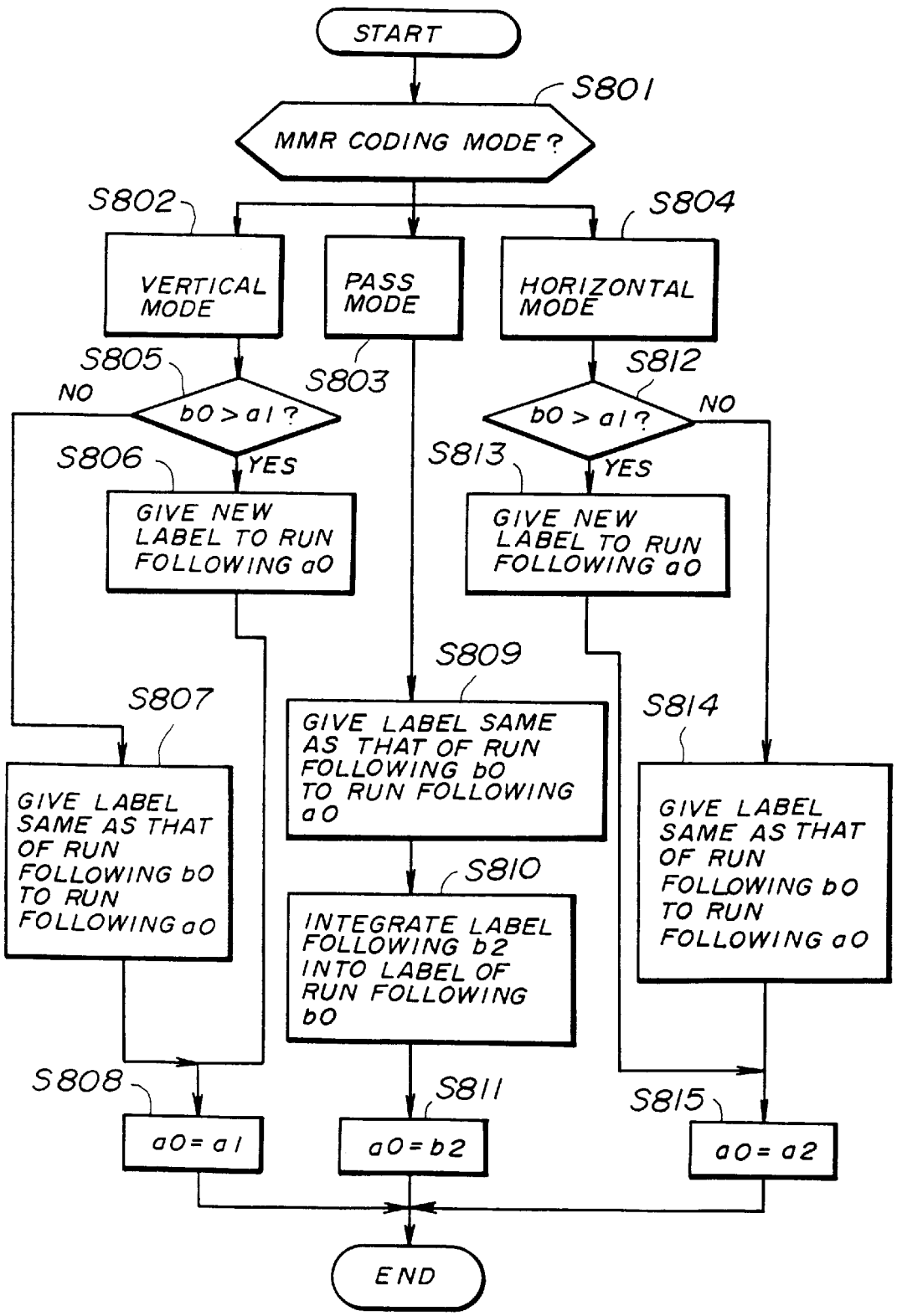

With reference to FIG. 9, an operation flow of the above-mentioned by-mode process 2 (for the case that a0 is the black pixel) will now be described. According to an encoding mode which was used for encoding a relevant portion of a scan line currently being decoded, an appropriate one of S802 for the vertical mode, S803 for the pass mode and S804 for the horizontal mode is selected, in S801. When S803 for the pass mode is selected, it is determined that a run starting at a0 is continuous with both a run starting at b0 and a run starting at b2 as shown in FIG. 6A. Accordingly, the same label as that of the run starting at b0 is designated to the run starting at a0 in S809, further a link is formed between the label of the run starting at b0 and a label of the run starting at b2 and thus these two labels are integrated together, in S810. Then, a0 is updated and thus a00 as a new a0 is positioned below the current b2, in S811.

When it is determined in S801 that S802 for the vertical mode is performed, it is determined in S805 whether or not b0>a1. If b0>a1, as shown in FIG. 6C, a new label is designated to a run starting at a0 in S806. If b0≦a1, as shown in FIG. 6B, it is determined that a run starting at a0 is continuous with a run starting at b0. Accordingly, the same label as that of the run starting at b0 is designated to the run starting at a0 in S807. After the labeling operation, a0 is updated and thus a new a0 is positioned at a position of the current a1 in S808.

When it is determined in S801 that S804 for the horizontal mode is performed, S812, S813 and S814 the same as S805, S806 and S807 for the vertical mode are appropriately performed. Then, a0 is updated and thus a new a0 is positioned at a position of the current a2 in S815.

By performing the above-described process, it is possible to perform the labeling operation directly on the MMR run length codes without developing the codes into a bit-map format. Further, as mentioned above, the MR and MMR encoding methods include the common encoding algorithm. In other words, an MR encoding operation is a combination of an MH encoding operation and an MMR encoding operation for each set of several scan lines. Accordingly, by performing the above-described process for each set of several scan lines, it is possible to perform the labeling operation directly on the MR run length codes.

When image patterns (continuous components) are extracted from a given image, and stored as corresponding templates, wherein a common template is designated for similar patterns so as to reduce image information and thus compress the image information, or when the OCR (Optical Character Recognition or Optical Character Reading) function is added to a facsimile machine, it is convenient to use the run length codes such as the MH codes, MR codes, and MMR codes which are normally used in facsimile transmission. In such a case, it is necessary to form a character from the MMR codes or the like. In such a case, in comparison to a method in the related art in which given image information is developed from given MMR codes thereof into a bit-map format thereof, it is advantageous for an increased data processing rate and a reduced scale of a system to perform the data processing by directly forming a character from the MH codes, MR codes or MMR codes according to the present invention described above.

The present invention includes a computer program product which is a storage medium including instructions which can be used to program a computer to perform a process of the invention. The storage medium can include, but is not limited to, any type of disk including floppy disks, optical discs, CD-ROMs, and magneto-optical discs, ROMs, RAMs, EPROMs, suitable for storing electronic instructions.

Further, the present invention is not limited to the above-described embodiments, and variations and modifications may be made without departing from the scope of the present invention.

What is claimed is:

1. An image processing method,
where:
  a first pixel of a run currently being decoded on a scan line currently being decoded is referred to as a0;
  a first color-changing pixel present to the right of a0 is referred to as a1;
  a first color-changing pixel present to the right of a1 is referred to as a2;
  a first pixel, on an immediately preceding decoded scan line, present to right of a0 and having a color different from that of a0 is referred to as b1;
  a first pixel of a run immediately to the left of b1 is referred to as b0; and
  a first color-changing pixel present to the right of b1 is referred to as b2;
said method comprising steps of:
  a) obtaining positions of b0, b1 and b2 with respect to an initialized position of a0 using decoded information of said immediately preceding decoded scan line;
  b) decoding MMR or MR codes for said scan line currently being decoded;
  c) determining whether a0 is a white pixel;
  d) determining, if it is determined in said step c) that a0 is the white pixel, whether a relevant encoded mode in a relevant one of said MR and MMR codes is a pass mode, a vertical mode or a horizontal mode;
  e) setting a new a0 below b2 if it is determined in said step d) that said encoded mode is said pass mode;

f) designating, if it is determined in said step d) that said encoded mode is said vertical mode, when b0≧a1, the same label as that of a black-pixel run ending at a pixel immediately to the left of b0 to a black-pixel run starting at a1, and setting a new a0 at a position of a1;

g) designating, if it is determined in said step d) that said encoded mode is said horizontal mode, when b0≧a1, the same label as that of a black-pixel run ending at a pixel immediately to the left of b0 to a black-pixel run starting at a1, and if further a2≧b1, integrating a label of a black-pixel run starting at b1 into the label of the black-pixel run ending at a pixel immediately to the left of b0, and setting a new a0 to a position of a2;

h) designating, if it is determined in said step d) that said encoded mode is said horizontal mode, when b0<a1 and also a2<b1, a new label to a black-pixel run starting at a1, and setting a new a0 to a position of a2; and i) designating, if it is determined in said step d) that said encoded mode is said horizontal mode, when b0<a1 and also a2>b1, the same label as that of a black-pixel run starting at b1 to a black-pixel run starting at a1, and setting a new a0 to a position of a2.

2. An image processing method,
where:
a first pixel of a run currently being decoded on a scan line currently being decoded is referred to as a0;
a first color-changing pixel present to the right of a0 is referred to as a1;
a first color-changing pixel present to the right of a1 is referred to as a2;
a first pixel, on an immediately preceding decoded scan line, present to the right of a0 and having a color different from that of a0 is referred to as b1;
a first pixel of a run immediately to the left of b1 is referred to as b0; and
a first color-changing pixel present to the right of b1 is referred to as b2;
said method comprising steps of:
a) obtaining positions of b0, b1 and b2 with respect to an initialized position of a0 using decoded information of said immediately preceding decoded scan line;
b) decoding MMR or MR codes for said scan line currently being decoded;
c) determining whether a0 is a black pixel;
d) determining, if it is determined in said step c) that a0 is the black pixel, whether a relevant encoded mode in a relevant one of said MR and MMR codes is a pass mode, a vertical mode or a horizontal mode;
e) designating, if it is determined in said step d) that said encoded mode is said pass mode, the same label as that of a black-pixel run starting at b0 to a black-pixel run starting at a0, integrating a label of a black-pixel run starting at b2 into the label of said black-pixel run starting at b0, and setting a new a0 below b2;
f) designating, if it is determined in said step d) that said encoded mode is said vertical mode, when b0≦a1, the same label as that of a black-pixel run starting at b0 to a black-pixel run starting at a0, and setting a new a0 at a position of a1;
g) designating, if it is determined in said step d) that said encoded mode is said vertical mode, when b0>a1, a new label to a black-pixel run starting at a0, and setting a new a0 at a position of a1;

h) designating, if it is determined in said step d) that said encoded mode is said horizontal mode, when b0≦a1, the same label as that of a black-pixel run starting at b0 to a black-pixel run starting at a0, and setting a new a0 at a position of a2; and i) designating, if it is determined in said step d) that said encoded mode is said horizontal mode, when b0>a1, a new label to a black-pixel run starting at a0, and setting a new a0 at a position of a2.

3. An image processing method,
where:
a first pixel of a run currently being decoded on a scan line currently being decoded is referred to as a0;
a first color-changing pixel present to the right of a0 is referred to as a1;
a first color-changing pixel present to the right of a1 is referred to as a2;
a first pixel, on an immediately preceding decoded scan line, present at right of a0 and having a color different from that of a0 is referred to as b1;
a first pixel of a run immediately to the left of b1 is referred to as b0; and
a first color-changing pixel present at the right of b1 is referred to as b2;
said method comprising steps of:
a) obtaining positions of b0, b1 and b2 with respect to an initialized position of a0 using decoded information of said immediately preceding decoded scan line;
b) decoding MMR or MR codes for said scan line currently being decoded;
c) determining whether a0 is a white or black pixel;
d) determining, if it is determined in said step c) that a0 is the white pixel, whether a relevant encoded mode in a relevant one of said MR and MMR codes is a pass mode, a vertical mode or a horizontal mode;
e) setting a new a0 below b2 if it is determined in said step d) that said encoded mode is said pass mode;
f) designating, if it is determined in said step d) that said encoded mode is said vertical mode, when b0≧a1, the same label as that of a black-pixel run ending at a pixel immediately to the left of b0 to a black-pixel run starting at a1, and setting a new a0 at a position of a1;
g) designating, if it is determined in said step d) that said encoded mode is said horizontal mode, when b0≧a1, the same label as that of a black-pixel run ending at a pixel immediately to the left of b0 to a black-pixel run starting at a1, and if further a2≧b1, integrating a label of a black-pixel run starting at b1 into the label of the black-pixel run ending at a pixel immediately to the left of b0, and setting a new a0 to a position of a2;
h) designating, if it is determined in said step d) that said encoded mode is said horizontal mode, when b0<a1 and also a2<b1, a new label to a black-pixel run starting at a1, and setting a new a0 to a position of a2;
i) designating, if it is determined in said step d) that said encoded mode is said horizontal mode, when b0<a1 and also a2≧b1, the same label as that of a black-pixel run starting at b1 to a black-pixel run starting at a1, and setting a new a0 to a position of a2;

j) determining, if it is determined in said step c) that a0 is the black pixel, whether a relevant encoded mode in a relevant one of said MR and MMR codes is said pass mode, said vertical mode or said horizontal mode;

k) designating, if it is determined in said step j) that said encoded mode is said pass mode, the same label as that of a black-pixel run starting at b0 to a black-pixel run starting at a0, integrating a label of a black-pixel run starting at b2 into the label of said black-pixel run starting at b0, and setting a new a0 below b2;

l) designating, if it is determined in said step j) that said encoded mode is said vertical mode, when $b0 \leq a1$, the same label as that of a black-pixel run starting at b0 to a black-pixel run starting at a0, and setting a new a0 at a position of a1;

m) designating, if it is determined in said step j) that said encoded mode is said vertical mode, when $b0 > a1$, a new label to a black-pixel run starting at a0, and setting a new a0 at a position of a1;

n) designating, if it is determined in said step j) that said encoded mode is said horizontal mode, when $b0 \leq a1$, the same label as that of a black-pixel run starting at b0 to a black-pixel run starting at a0, and setting a new a0 at a position of a2;

o) designating, if it is determined in said step j) that said encoded mode is said horizontal mode, when $b0 > a1$, a new label to a black-pixel run starting at a0, and setting a new a0 at a position of a2;

p) obtaining, if the entirety of said scan line currently being decoded has not been processed, new positions of b0, b1 and b2 with respect to thus-set new a0, and proceeding with an above-described process; and q) updating, if the entirety of said currently decoded scan line has not been processed, said immediately preceding decoded scan line and scan line currently being decoded, and repeating an above-described process after initializing a0 until all scan lines have been processed.

4. A computer program product having a computer readable medium having computer program logic recorded therein for performing image processing, where:
a first pixel of a run currently being decoded on a scan line currently being decoded is referred to as a0;
a first color-changing pixel present to the right of a0 is referred to as a1;
a first color-changing pixel present to the right of a1 is referred to as a2;
a first pixel, on an immediately preceding decoded scan line, present to right of a0 and having a color different from that of a0 is referred to as b1;
a first pixel of a run immediately to the left of b1 is referred to as b0; and
a first color-changing pixel present to the right of b1 is referred to as b2;
said product comprising:
means for obtaining positions of b0, b1 and b2 with respect to an initialized position of a0 using decoded information of said immediately preceding decoded scan line;
means for decoding MMR or MR codes for said scan line currently being decoded;
means for determining whether a0 is a white pixel;
means for determining, if it is determined by said first determining means that a0 is the white pixel, whether a relevant encoded mode in a relevant one of said MR and MMR codes is a pass mode, a vertical mode or a horizontal mode;
means for setting a new a0 below b2 if it is determined by said second determining means that said encoded mode is said pass mode;
means for designating, if it is determined by said second determining means that said encoded mode is said vertical mode, when $b0 \geq a1$, the same label as that of a black-pixel run ending at a pixel immediately to the left of b0 to a black-pixel run starting at a1, and setting a new a0 at a position of a1;
means for designating, if it is determined by said second determining means that said encoded mode is said horizontal mode, when $b0 \geq a1$, the same label as that of a black-pixel run ending at a pixel immediately to the left of b0 to a black-pixel run starting at a1, and if further $a2 \geq b1$, integrating a label of a black-pixel run starting at b1 into the label of the black-pixel run ending at a pixel immediately to the left of b0, and setting a new a0 to a position of a2;
means for designating, if it is determined by said second determining means that said encoded mode is said horizontal mode, when $b0 < a1$ and also $a2 < b1$, a new label to a black-pixel run starting at a1, and setting a new a0 to a position of a2; and
means for designating, if it is determined by said second determining means that said encoded mode is said horizontal mode, when $b0 < a1$ and also $a2 \geq b1$, the same label as that of a black-pixel run starting at b1 to a black-pixel run starting at a1, and setting a new a0 to a position of a2.

5. A computer program product having a computer readable medium having computer program logic recorded therein for performing image processing, where:
a first pixel of a run currently being decoded on a scan line currently being decoded is referred to as a0;
a first color-changing pixel present to the right of a0 is referred to as a1;
a first color-changing pixel present to the right of a1 is referred to as a2;
a first pixel, on an immediately preceding decoded scan line, present to the right of a0 and having a color different from that of a0 is referred to as b1;
a first pixel of a run immediately to the left of b1 is referred to as b0; and
a first color-changing pixel present to the right of b1 is referred to as b2;
said product comprising:
means for obtaining positions of b0, b1 and b2 with respect to an initialized position of a0 using decoded information of said immediately preceding decoded scan line;
means for decoding MMR or MR codes for said scan line currently being decoded;
means for determining whether a0 is a black pixel;
means for determining, if it is determined by said first determining means that a0 is the black pixel, whether a relevant encoded mode in a relevant one of said MR and MMR codes is a pass mode, a vertical mode or a horizontal mode;
means for designating, if it is determined by said second determining means that said encoded mode is said pass mode, the same label as that of a black-pixel run starting at b0 to a black-pixel run starting at a0, integrating a label of a black-pixel run starting at b2 into the label of said black-pixel run starting at b0, and setting a new a0 below b2;

means for designating, if it is determined by said second determining means that said encoded mode is said vertical mode, when b0≦a1, the same label as that of a black-pixel run starting at b0 to a black-pixel run starting at a0, and setting a new a0 at a position of a1;

means for designating, if it is determined by said second determining means that said encoded mode is said vertical mode, when b0>a1, a new label to a black-pixel run starting at a0, and setting a new a0 at a position of a1;

means for designating, if it is determined by said second determining means that said encoded mode is said horizontal mode, when b0≦a1, the same label as that of a black-pixel run starting at b0 to a black-pixel run starting at a0, and setting a new a0 at a position of a2; and means for designating, if it is determined by said second determining means that said encoded mode is said horizontal mode, when b0>a1, a new label to a black-pixel run starting at a0, and setting a new a0 at a position of a2.

6. A computer program product having a computer readable medium having computer program logic recorded therein for performing image processing, where:

a first pixel of a run currently being decoded on a scan line currently being decoded is referred to as a0;

a first color-changing pixel present to the right of a0 is referred to as a1;

a first color-changing pixel present to the right of a1 is referred to as a2;

a first pixel, on an immediately preceding decoded scan line, present at right of a0 and having a color different from that of a0 is referred to as b1;

a first pixel of a run immediately to the left of b1 is referred to as b0; and a first color-changing pixel present at the right of b1 is referred to as b2;

said product comprising:

means for obtaining positions of b0, b1 and b2 with respect to an initialized position of a0 using decoded information of said immediately preceding decoded scan line;

means for decoding MMR or MR codes for said scan line currently being decoded;

means for determining whether a0 is a white or black pixel;

means for determining, if it is determined by said first determining means that a0 is the white pixel, whether a relevant encoded mode in a relevant one of said MR and MMR codes is a pass mode, a vertical mode or a horizontal mode;

means for setting a new a0 below b2 if it is determined in said step d) that said encoded mode is said pass mode;

means for designating, if it is determined by said second determining means that said encoded mode is said vertical mode, when b0≧a1, the same label as that of a black-pixel run ending at a pixel immediately to the left of b0 to a black-pixel run starting at a1, and setting a new a0 at a position of a1;

means for designating, if it is determined by said second determining means that said encoded mode is said horizontal mode, when b0≧a1, the same label as that of a black-pixel run ending at a pixel immediately to the left of b0 to a black-pixel run starting at a1, and if further a2≧b1, integrating a label of a black-pixel run starting at b1 into the label of the black-pixel run ending at a pixel immediately to the left of b0, and setting a new a0 to a position of a2;

means for designating, if it is determined by said second determining means that said encoded mode is said horizontal mode, when b0<a1 and also a2<b1, a new label to a black-pixel run starting at a1, and setting a new a0 to a position of a2;

means for designating, if it is determined by said second determining means that said encoded mode is said horizontal mode, when b0<a1 and also a2≧b1, the same label as that of a black-pixel run starting at b1 to a black-pixel run starting at a1, and setting a new a0 to a position of a2;

means for determining, if it is determined by said first determining means that a0 is the black pixel, whether a relevant encoded mode in a relevant one of said MR and MMR codes is said pass mode, said vertical mode or said horizontal mode;

means for designating, if it is determined by said third determining means that said encoded mode is said pass mode, the same label as that of a black-pixel run starting at b0 to a black-pixel run starting at a0, integrating a label of a black-pixel run starting at b2 into the label of said black-pixel run starting at b0, and setting a new a0 below b2;

means for designating, if it is determined by said third determining means that said encoded mode is said vertical mode, when b0≦a1, the same label as that of a black-pixel run starting at b0 to a black-pixel run starting at a0, and setting a new a0 at a position of a1;

means for designating, if it is determined by said third determining means that said encoded mode is said vertical mode, when b0>a1, a new label to a black-pixel run starting at a0, and setting a new a0 at a position of a1;

means for designating, if it is determined by said third determining means that said encoded mode is said horizontal mode, when b0≦a1, the same label as that of a black-pixel run starting at b0 to a black-pixel run starting at a0, and setting a new a0 at a position of a2;

means for designating, if it is determined by said third determining means that said encoded mode is said horizontal mode, when b0>a1, a new label to a black-pixel run starting at a0, and setting a new a0 at a position of a2;

means for obtaining, if the entirety of said scan line currently being decoded has not been processed, new positions of b0, b1 and b2 with respect to thus-set new a0, and proceeding with an above-described process; and means for updating, if the entirety of said currently decoded scan line has not been processed, said immediately preceding decoded scan line and scan line currently being decoded, and repeating an above-described process after initializing a0 until all scan lines have been processed.

\* \* \* \* \*